(12) United States Patent
Thurston et al.

(10) Patent No.: US 8,527,374 B2
(45) Date of Patent: Sep. 3, 2013

(54) METHOD AND APPARATUS FOR DATA ACQUISITION IN AN ASSET HEALTH MANAGEMENT SYSTEM

(75) Inventors: Michael G. Thurston, Penfield, NY (US); Christopher E. Piggott, Pittsford, NY (US)

(73) Assignee: Rochester Institute of Technology, Rochester, NY (US)

( * ) Notice: Subject to any disclaimer, the term of this patent is extended or adjusted under 35 U.S.C. 154(b) by 877 days.

(21) Appl. No.: 12/077,775

(22) Filed: Mar. 21, 2008

(65) Prior Publication Data

US 2009/0240604 A1   Sep. 24, 2009

(51) Int. Cl.
*G06Q 40/00* (2012.01)
(52) U.S. Cl.
USPC .......................................................... 705/29
(58) Field of Classification Search
USPC ........................................ 318/245; 342/375
See application file for complete search history.

(56) References Cited

U.S. PATENT DOCUMENTS

| | | | | |
|---|---|---|---|---|
| 4,527,101 | A * | 7/1985 | Zavis et al. | 318/245 |
| 7,642,963 | B2 * | 1/2010 | Apostolos et al. | 342/375 |
| 7,908,309 | B1 * | 3/2011 | Macdonald | 708/820 |
| 2003/0200022 | A1 | 10/2003 | Streichsbier et al. | |
| 2004/0054821 | A1 | 3/2004 | Warren et al. | |
| 2007/0244622 | A1 | 10/2007 | Shimura et al. | |
| 2008/0027619 | A1 * | 1/2008 | Aspelmayr et al. | 701/101 |
| 2008/0036617 | A1 | 2/2008 | Arms et al. | |

OTHER PUBLICATIONS

PCT ISA220 International Search Report for PCT/US2009/37858 (Mar. 20, 2009).

* cited by examiner

*Primary Examiner* — Shay S Glass

(74) *Attorney, Agent, or Firm* — Joseph M. Noto; Bond Schoeneck & King PLLC

(57) ABSTRACT

An asset management system includes a controller area network bus and a data acquisition module connected to the controller area network bus. The data acquisition module has a plurality of analog input channels. One or more sensor systems are connected to the input channels with the input channels receiving analog signals from the sensor systems. The data acquisition module passively conditions the received analog signals prior to digital conversion.

22 Claims, 6 Drawing Sheets

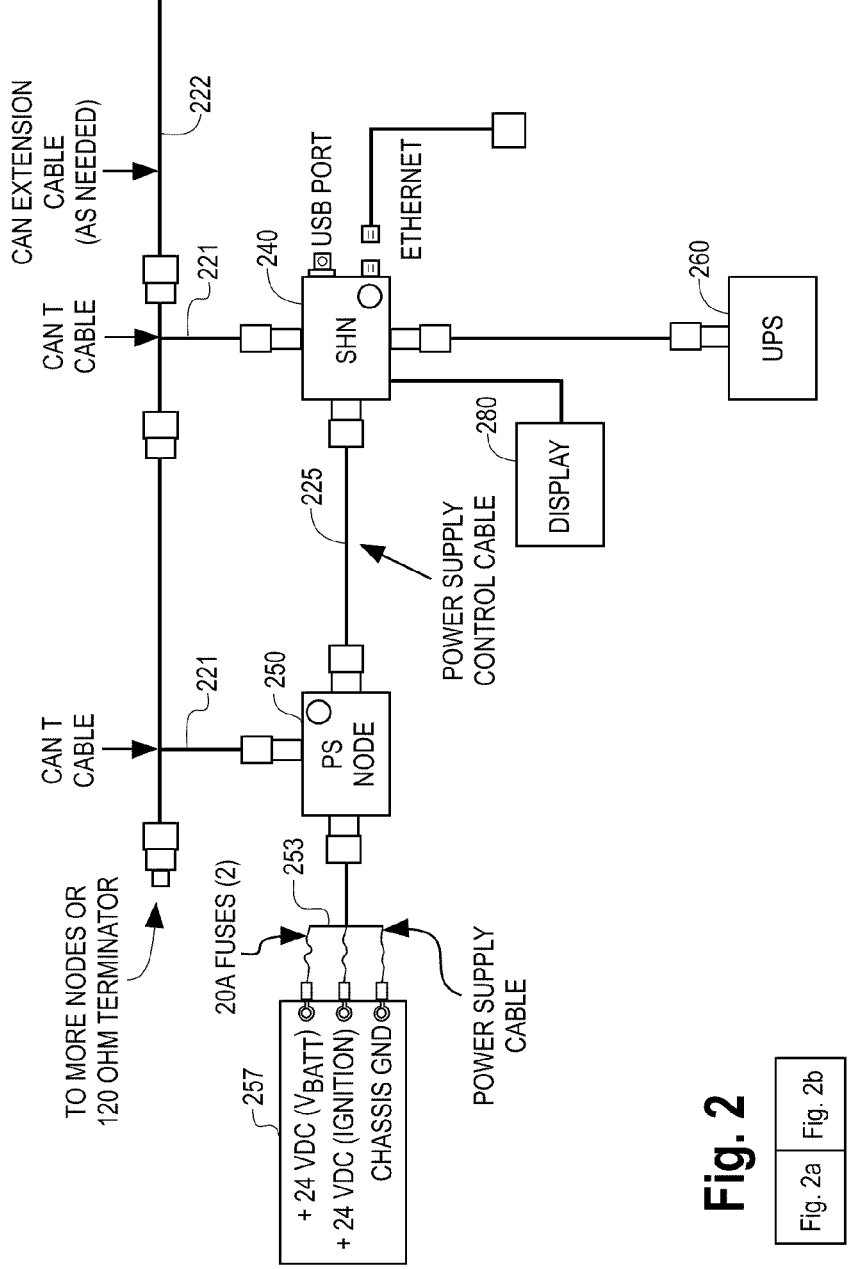

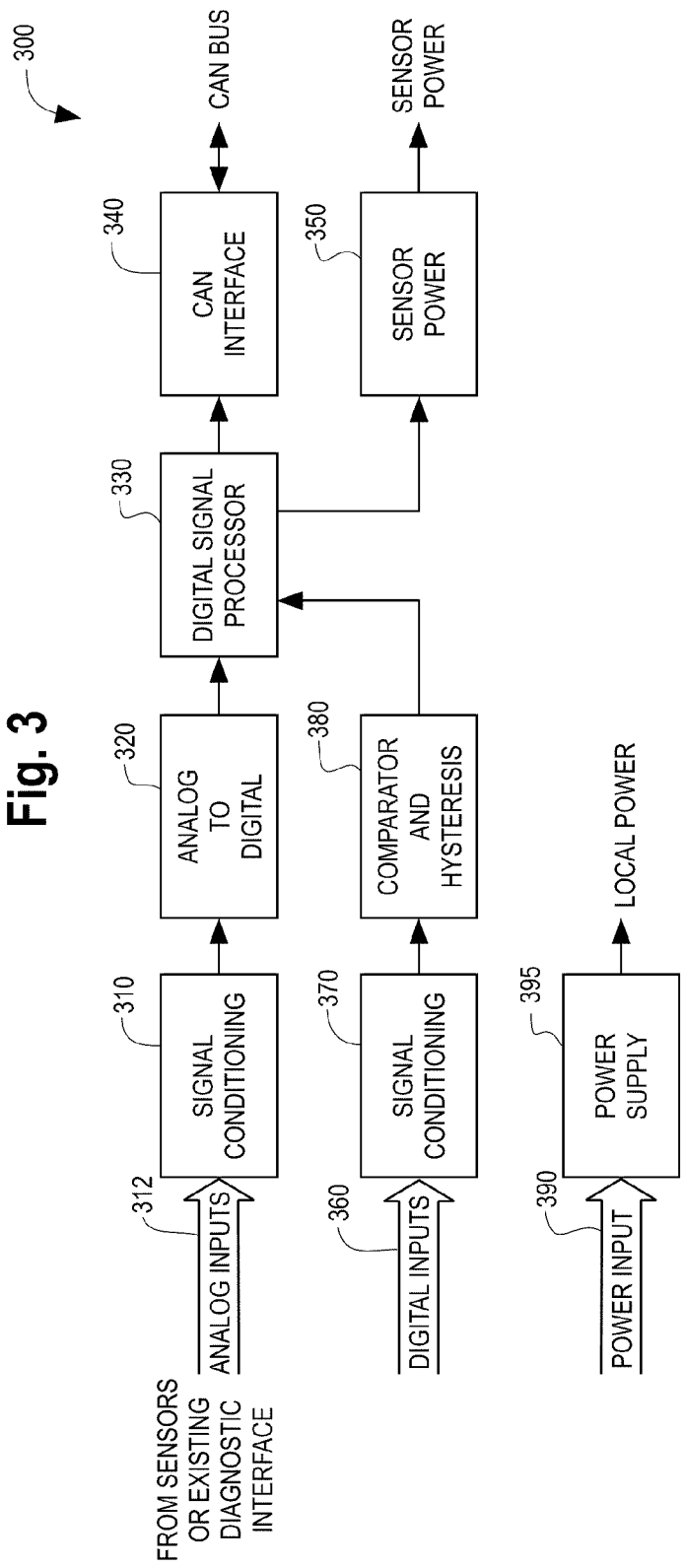

METHOD AND APPARATUS FOR DATA ACQUISITION IN AN ASSET HEALTH MANAGEMENT SYSTEM

FEDERALLY SPONSORED RESEARCH OR DEVELOPMENT

The subject invention was made with government support under Grant Nos. N00014-05-1-0708 and N00014-06-1-0998, awarded by the Office of Naval Research. The U.S. Government may have certain rights. The U.S. Government has a paid-up license in this invention and the right in limited circumstances to require the patent owner to license others on reasonable terms as provided for by the terms of Grant Nos. N00014-05-1-0708 and N00014-06-1-0998.

FIELD OF THE INVENTION

The present invention relates generally to a method and apparatus for acquiring data in an asset management system, and more particularly, to measure input signals and report resulting information on a data bus network for an on-board asset health management system.

BACKGROUND

Existing on-board data acquisition systems for vehicles are mostly ad-hoc, and only take into account short-term operations planning based on recent maintenance history. For example, many vehicles have sensors and external interfaces that are used to measure system performance and to diagnose problems. On certain vehicles, signals from sensors are sometimes used to drive panel gauges or to link various subsystems of the vehicles, such as the engine, transmission, or anti-lock brake system units. The information received by the on-board diagnostic equipment associated with existing data acquisition systems are typically only used in a repair facility and have a limited amount of historical data available.

SUMMARY

According to one aspect of the invention, an asset management system comprises a controller area network bus. A data acquisition module is connected to the controller area network bus. The data acquisition module has a plurality of analog input channels. One or more sensor systems are connected to the input channels. The input channels receive analog signals from the sensor systems. The data acquisition module passively conditions the received analog signals prior to digital conversion.

According to another aspect of the invention, an asset health management system comprises a data acquisition module connected to a data bus. The data acquisition module has a plurality of input channels. A power supply module provides power to the data acquisition module. A plurality of sensors are connected to the input channels with at least one of said sensors having a different power requirement than another sensor. Power to each of the plurality of sensors is provided based on the power requirement of each sensor. The power is provided through the data acquisition module.

According to another aspect of the invention, a data acquisition device for an asset management system comprises a plurality of analog inputs for receiving first signal data from a first sensor and second signal data from a second sensor. The analog inputs are capable of receiving first signal data having a different voltage range than the second signal data. A passive analog signal conditioner conditions the first signal data and the second signal data. A high dynamic range analog-to-digital converter converts the first signal data and the second signal data. The analog-to-digital converter is connected to the passive analog signal conditioner. The analog-to-digital converter operates over a single input range.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIGS. 2*a-b* illustrate a block diagram of an asset health management system in accordance with another embodiment;

FIG. 3 is a block diagram illustrating data acquisition system operations for the asset health management system of FIGS. 2*a-b;*

DETAILED DESCRIPTION

Figure 1:
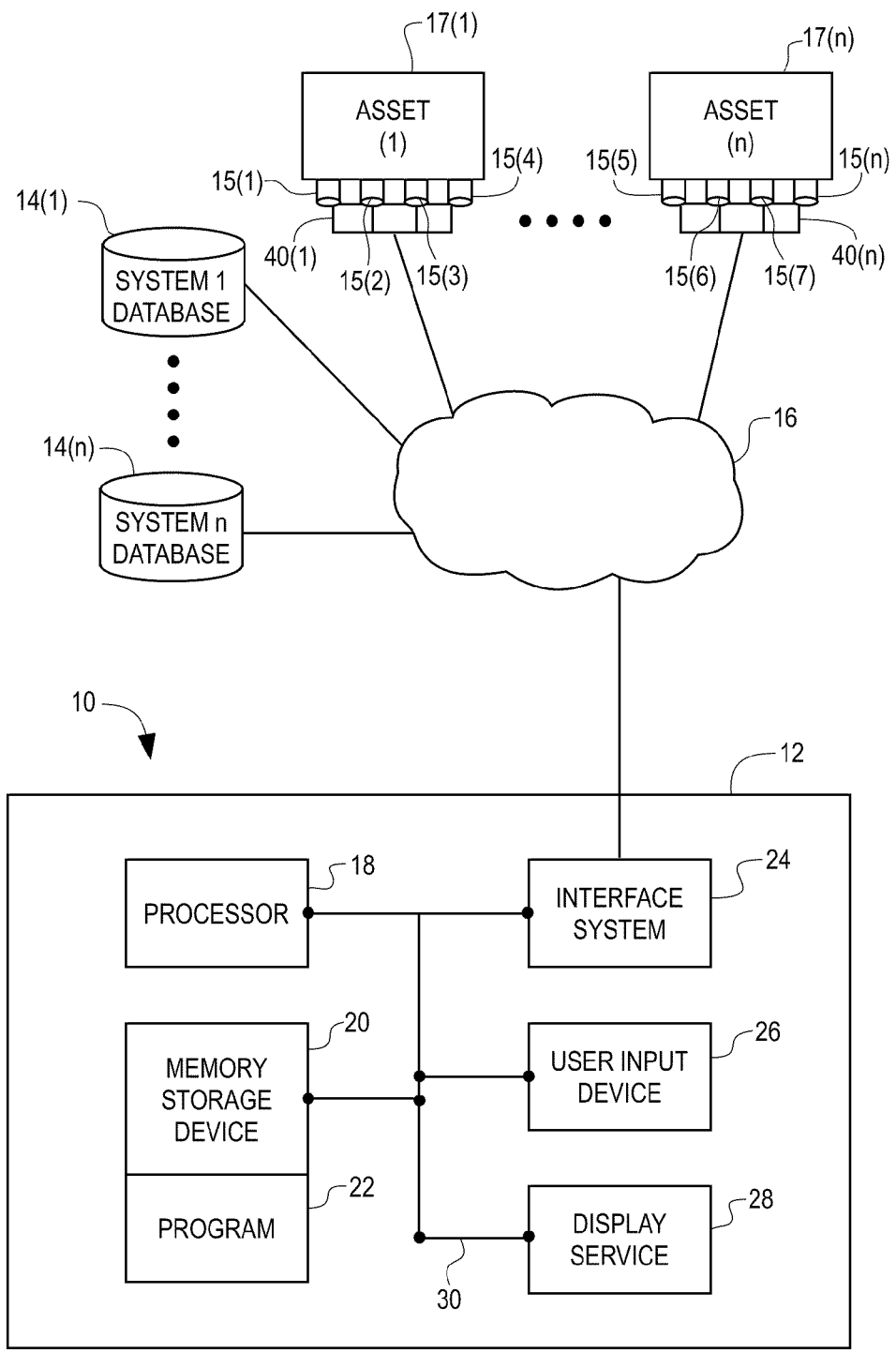
FIG. 1 is a block diagram of an asset management system in accordance with one embodiment.

While this invention is susceptible of embodiment in many different forms, there is shown in the drawings and will herein be described in detail certain embodiments of the invention with the understanding that the present disclosure is to be considered as an exemplification of the principles of the invention and is not intended to limit the broad aspect of the invention to the embodiments illustrated.

Asset management systems enhance command and control effectiveness, improve maintenance and supply logistics, and reduce operations and support costs, for platforms that incorporate the technology. An asset health management system is a data acquisition network for measuring the health and performance of complex electromechanical systems. Asset health management technology can be applied to military and non-military platforms, such as ships, aircraft, ground vehicles, and a variety of electromechanical systems including engines and industrial equipment. An asset health management system can include a sensor network, software components, data storage capabilities and an information network. The sensor network gathers data from sensors and transmits the data to software-controlled components that read and process the sensor data. The sensor network can further include data storage using, for example, a database. The information network allows access to data in the database through the use of external systems and can further allow the performance of administrative activities.

An asset health management system includes various hardware components including, for example, a system health node having a central processor and information store for providing high-level diagnostic and prognostic assessments for the host platform (e.g., ground vehicle, air plane, ship, industrial equipment). The system can further include data acquisition nodes and operator interface devices.

The components of an asset management system can communicate using, for example, a controller area network (CAN) (e.g., J1939-compatible) data bus in which one cable can provide both bus communication and distributed power for the various nodes in the system. In certain embodiments, the communication and power elements can be delivered using separate cables or alternate communication and power delivery systems. The cable comprises separate shielded sections for communications and power, and may also include multiple grounds to fully isolate the controller area network and power. A centralized power supply and conditioner can be used to feed the data bus.

Controller area networks are often used in vehicle data networks and in industrial automation systems. An example of a controller area network in a motor vehicle can include a data bus having a cable with two wires and a power source. The data bus is distributed to various components throughout the vehicle. That is, instead of distributing numerous separate wires to a component of a motor vehicle (e.g., a door), a single controller area network bus can be connected to, for example, the power mirror, power windows, power door locks, and the lights on the door of the vehicle. Digital communication packets can then be sent along the controller area network bus with the packets specific to one or more of the individual components. The packets can include an instruction, such as, for example, to lock or unlock a door.

An asset management system can also include algorithms for controlling the system by performing certain task, such as, for example: (i) gathering data from a data carrying network, (ii) processing data on multiple levels to identify system anomalies, and (iii) making diagnostic and prognostic assessments. If the system detects an anomaly, the host platform user can be notified, through communications with an operator interface device, so that corrective action, if any, can be made. Data that is stored by the system (e.g., in a database) can also be transferred to an external system for further analysis or long-term storage. The transfer of data can be done manually using physical media or automatically over a network.

In certain embodiments, sensors positioned at various monitoring points in the asset management system measure voltages at the various points to provide data, such as pressure, fluid level, temperature, or perhaps vibration information, for the particular asset(s) being monitored. The data from the sensors are then collected through the asset health management system and processed to make a health assessment of the asset. For example, if the host platform for the asset health management system is a military ground vehicle, one sensor may monitor oil temperature in an asset, such as the engine, which can be assessed independently, or in conjunction with data from other sensors, to determine if the asset is failing or has a limited remaining useful life. After assessing the health of the asset, the asset management system can then alert the vehicle operator so that appropriate action can be taken, such as aborting a mission, making a quick repair, calling ahead for parts, etc.

In certain embodiments, asset management systems are used prognostically to determine the remaining life of an asset. Data can be assessed from one or more sensors to predict failures in advance or to notify an operator how long before a failure will occur. The predictions can be based on statistics and trends, along with the running history data collected from the sensors. In one example, an asset health management system can monitor and update the remaining useful life of a vehicle battery following the failure of an alternator. The asset health management system may deliver a report to a display for the vehicle operator that indicates the alternator has failed. The report may also indicate that under current conditions the battery has 6 hours of remaining useful life. Shortly thereafter, the operator may need to turn on the headlights, which adjusts the electrical load the vehicle is experiencing. The asset health management system may then provide an update to the operator that under the revised electrical load, only 3 hours of useful life remains in the battery.

Asset management systems can continually record and store the history of sensor readings taken for the various assets of a vehicle. For example, an asset management system may keep a running history of the oil temperature of a vehicle to determine what happens both prior to, during, and after a particular condition or event (e.g., driving up a hill) is experienced by the vehicle. The asset management system may be linked to other systems in the vehicle that assess other vehicle parameters indicative of whether a condition or event is occurring. Under certain conditions or events (e.g., driving uphill), an increase in oil temperature may be considered normal or expected. However, for other conditions or event (e.g., driving downhill or on a solid, flat terrain), the increase in oil temperature may not be normal or expected, which can trigger the system to report an anomaly in the asset.

Asset management systems can include different types of components and systems arranged as described herein and in other manners. Other non-limiting examples of asset management systems can be found in U.S. Patent Publication No. 2006/0282362 A1, published on Dec. 14, 2006, entitled "Methods For Asset Health Management And Systems Thereof", which is incorporated herein by reference in its entirety.

Referring now to FIG. 1, a processing system 12 includes at least one processor 18, at least one memory storage device 20 which stores programmed instructions, at least one interface system or device 24, at least one user input device 26, and at least one display device 28, which are coupled together by a bus system 30 or other link. The processing system 12 may also comprise other components, other numbers of the components, and other combinations of the components. In this particular embodiment, the processor 18 executes a program 22 of stored instructions in memory storage device 20 for at least a portion of the method for optimizing utilization of one or more assets 17(1)-17(n). The memory storage device 20 stores these programmed instructions, including program 22, in a memory device, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 18. In certain embodiments, the programmed instructions in the processing system 12 that are executed by the processor 18 may be stored or executed elsewhere within the system or external to the system. The input/output interface 20 is used to operatively couple and communicate between the processing system 12 and the component information system 14. The user input device 23 enables an operator to generate and transmit signals or commands to the processor 18, such as inputting data or requests for data about components, although the user input device is optional. A variety of different types of user input devices can be used, such as a keyboard or computer mouse. The display device 28 enables the operator to observe displayed data information, such as the optimization plan or instruction(s). A variety of different types of display devices can be used, such as a CRT or a printer.

The database(s) 14(1)-14(n) store data, such as historical maintenance data, life cycle data, specifications, performance, and status, for each of the elements of each of the assets 17(1)-17(n). These databases 14(1)-14(n) can be supplemented on an ongoing basis with additional data, such as historical maintenance data and life cycle data, obtained from the management and optimization of the assets 17(1)-17(n). For example, one of the databases 14(1)-14(n) may store tables or graphs showing the expected time to failure versus the usage of an element in one of the assets, which can be utilized in determining an optimization plan or instructions(s).

The sensors 15(1)-15(n) are coupled to the processing system 12 via communication system 16, although data from the sensors 15(1)-15(n) can be provided to the processing system 12 in other manners, such as by being input into processing system 12 using user input device 26. The sensors 15(1)-15(n) monitor and provide data about the operation and condition of elements in each of the assets 17(1)-17(n), such as, for example, performance data, temperature readings, detected failures, and images. In this particular embodiment, sensors 15(1)-15(3) are each coupled to different elements in asset 17(1) and sensors 15(5)-15(n) are each coupled to different elements in asset 17(n), although other numbers, types and combinations of sensors for each of the assets 17(1)- 17(n) can be used. A variety of different types and numbers of assets 17(1)-17(n) can be managed, such as automobiles, tanks, planes, machines, etc. and a variety of different elements in each asset can be monitored.

Communication system 16 is used to control and manage communication between processing system 12, databases 14(1)-14(n), and sensors 15(1)-15(n). The embodiment of FIG. 1 illustrates a wireless network, although other types and numbers of communication systems and/or methods can be used, such as a direct connection, Ethernet, a local area network, a wide area network, or modems and phone lines, each having communications protocols.

In certain embodiments, the elements of the asset management system, including processing system 12, databases 14(1)-14(n) and the sensors 15(1)-15(n), can be linked together through a controller area network bus to monitor assets 17(1)-(n). The elements can be linked individually (e.g., sensors 15(1)-(4)), collectively (e.g., processing system 12, databases 14, sensors 15) or in some combination thereof (e.g., processing system 12 in one CAN bus and sensors 15(1)-(n) in another CAN bus). In the embodiment illustrated in FIG. 1, a controller area network data bus is used for bus system 30, which links the elements of processor system 12. Sensors 15(1)-(4) and 15(5)-(n) are linked by a first sensor bus 40(1) and an n-th sensor bus 40(n), all of which can be controller area network buses. The sensors 15(1)-(n) used to monitor assets 17(1)-(n) can all be linked together using a single controller area network bus or a series thereof (e.g., sensor buses 40(1)-(n)).

A controller area network bus can be configured as a straight line system that can be continuously wired throughout a host platform (e.g., vehicle) so that sensor(s) monitoring particular assets of concern (e.g., engine, tire, battery) can be connected to the bus. The controller area network can then monitor and record readings from the sensors 15. The sensor bus 40 can comprise two twisted wires within a bus cable that is placed throughout within the host platform.

Figure 2B:
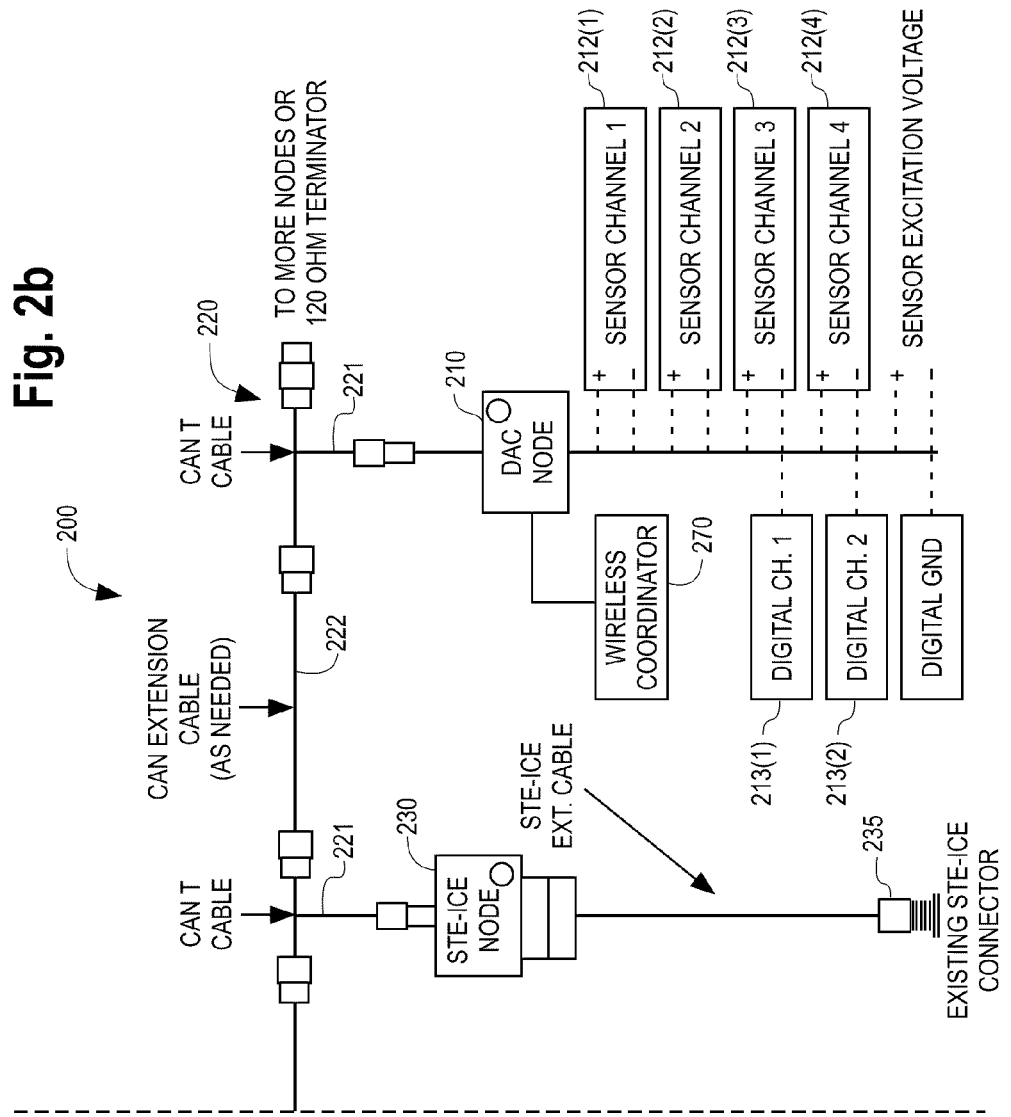

Referring now to FIGS. 2a-b, an exemplary embodiment of an asset management system 200 is described. The asset management system can include a data acquisition node 210 having a number of channels, such as sensor channel(s) 212(1)-212(4), that are connected to sensors that monitor various assets of the asset health management system. The sensor channel(s) 212 can be analog inputs that receive excitation voltage(s) from the sensor(s) that are then recorded in the data acquisition node 210. The data acquisition node 210 can also include digital channels, such as digital channel 213(1) and 213(2) that are capable of measuring, for example, frequencies. The data acquisition node 210 can further be connected to a cable 220 of a controller area network, similar, for example, to networks described elsewhere in this disclosure. The cable 220 can include one or more controller area network T- cables 221 and one or more controller area network extension cables 222. The cable 220 can be a data bus in which the cable 220 provides both bus communications and distributed power for the various nodes in the controller area network, including the data acquisition node(s) 210.

The data acquisition node 210 is a device that has the ability to sample input voltages received from different types of sensors. In the example of a ground vehicle, the different types of sensors that may be connected to the data acquisition node 210 can include temperature, voltage, current and pressure sensors. The information collected by the data acquisition node 210 is processed and then reported in the form of messages to the cable 220 for transmittal and receipt by, for example, a system health node 240. The data acquisition node can include a digital signal processor for processing the sensor data before the sensor data is transmitted to the data bus. For example, the digital signal processor may process the sensor data using filtering techniques, averaging techniques, time domain analysis, frequency domain analysis, implementing sensor fault detection, and/or implementing built-in sensor tests. The data acquisition node 210 can also be reprogrammed using data and instructions sent to the node 200 over the controller area network via the data bus. The data acquisition node 210 can be connected to many different sensor types, such as, for example, those usable on vehicles, ships, aircraft or industrial equipment.

A special type of data acquisition device that can be used in an asset management system 200 is a Simplified Test Equipment-Internal Combustion Engine node 230 also known by the acronym, STE-ICE. The STE-ICE node 230 can be used to rapidly implement tests and sensor measurements to assess the overall condition of the assets of a vehicle. The STE-ICE node 230 can include a diagnostic connector assembly interface, such as, for example, found on U.S. military ground vehicles.

A controller area network bus architecture can be used that includes a data bus (e.g., cable 220). The bus network allows the system health network 240 to communicate with the data acquisition node 210 and/or STE-ICE node 230 and with human interface devices, such as, for example, a display 280 or input device (not shown). The display may be connected directly to the system health node 240 or it may be linked to the data bus (e.g., cable 220). Furthermore, as described previously, the controller area network data bus can distribute communications and power for the various nodes (e.g., data acquisition node 210) using the same cable. In certain embodiments, the data bus includes separate shielded sections for communication of data and power along with multiple grounds to allow for a fully isolated controller area network and power.

The system health node 240 can include algorithms for performing high-level diagnostic and prognostic assessments for the host (e.g., ground vehicle, airplane, ship, industrial equipment). It is contemplated for certain embodiments that the algorithms can assess historical and/or real-time sensor data and, furthermore, that the algorithms include logic applicable to the specific asset management application (e.g., monitoring ground vehicle assets, monitoring industrial equipment). The system health node 240 can, for example, include a processor and memory for supporting the storage, diagnostic and prognostic algorithms for specific management application(s). The system health node 240 can also include an interface to the controller area network for receiving data from the linked data acquisition node(s) 210, STE-ICE node 230 and associated sensor(s). The interface to the controller area network can also be used to transfer summary asset health information to a user interface, such as, for example, a driver or operator display panel 280. The system health node 240 can be based on a hard-wired and/or wireless (e.g., WiFi) network(s) for sending and retrieving data. In certain embodiments, the system health node 240 includes an intelligent power control to provide a gentle or gradual power-on and power-off of the asset management system 200.

FIGS. 2a-b further illustrate an embodiment of how a power supply node 250 can be included within an asset management system 200. The power supply node can be connected to cable 220 (e.g., controller area network T cable). Furthermore, a power supply control cable 225 can also be used that connects a node directly to the power supply node, such as, for example, shown for the connection between the power supply node 250 and the system health node 240. The system health node or any other node can also be protected from power loss in the asset management system using an uninterruptible power supply 260, as illustrated, for example, for system health node 240.

The power supply node 250 draws power from the host power system 257 using, for example, a power supply cable 253. If the host is a ground vehicle, the host power system 257 would typically be powered by a battery. In certain embodiments, nodes, such as the system health node 240, can draw very low, quiescent-state currents from the main vehicle battery using a digital timer that minimizes power and reduces current flow to an order of microamperes. Drawing very low currents assists with preserving a charge in the host power system, while allowing a node enough power to properly maintain systems. The power supply node 250 can also include a communication path, such as, for example, through cable 220 or power supply cable 225, to communicate power supply and switch status to a processor for the system health node 240. The communication path between the power supply node 250 and the system health node 240 may also allow the processor to signal when the system health node 240 has safely shut down so that the primary power can be reduced. In certain embodiments, a small battery or capacitor bank can be used as a backup power source in situation where host power may suddenly be disconnected or severed.

In certain embodiments, the power supply node 250 can include a buck converter that pre-regulates input power, along with a main DC-DC converter. The pre-regulator minimizes high voltage spikes, e.g., voltage or load-dump transients. While the pre-regulator can offer a fast response time to transient voltage events, certain embodiments can also include a mode that bypasses the pre-regulator when, for example, noise and efficiency of the power supply of the asset management system 200 may be a priority. It is contemplated that in certain embodiments the main DC-DC converter of the power supply node 250 can provide +9V, −9V and +24V to the various nodes connected to cable 120 of the asset management system 200. Other voltages can also be supplied to the nodes depending on the power requirements of the components of the system 200.

It is contemplated that in certain embodiments, a data acquisition node 210 having a low-channel count may be used that is compatible with a J1939 data bus structure. The data acquisition node 210 can have multiple analog inputs with a frequency range of approximately 0 to 2 kHz and varying input ranges, such as, for example, ±1V with an accuracy of ±10 mV, ±10V with an accuracy of ±50 mV, and ±40V with an accuracy of ±100 mV, with an allowable range of approximately 75V to +75V continuous. The data acquisition node 210 can also include digital inputs having, for example, a frequency range of approximately 0 to 5 KHz and input ranges of approximately ±40V. The data acquisition node 210 can further have a programmable DC sensor power output range of approximately 5 to 15V with up to a 75 mA current draw. It is further contemplated that in certain other embodiments, the data acquisition node 210 has approximate dimensions of 2-inches by 4-inches by 1-inch and a weight of approximately 10 ounces. The data acquisition node can have input voltages of +9V/−9V/+20V. In one embodiment, the data acquisition node 210 has a 180 mA current draw on an input of +9V. The data acquisition node 210 can further be reprogrammed over the data bus of a controller area network.

It is contemplated that a Simplified Test Equipment-Internal Combustion Engine node 130 can be used in an asset management system. For example, Light Armored Vehicles (LAV) or High Mobility Multipurpose Wheeled Vehicles (HMMWV) may provide STE-ICE signals for which signal access is desired in monitoring the vehicle assets. The STE-ICE node 230 can be J1939 compliant and periodically sample analog signals received at a STE-ICE connector 235. In one embodiment, the STE-ICE node 230 can sample at a frequency of 1 kHz with a 12 bit resolution. The sampling rate will typically vary according to the type of signal being sampled. Examples of the types of inputs that can be sampled by a STE-ICE node 230 include: battery voltage, battery current, air box pressure, starter volts, fuel pressure, fuel filter pressure, pulse tachometer, fuel return pressure, alternator field, alternator current, starter volts, air box pressure, turbo pressure, starter solenoid or air cleaner pressure. Various programmable, data processing algorithms can operate in the STE-ICE node for processing received analog signals and for determining what type of data to place onto the controller area network cable 220 (e.g., J1939 data bus). In certain embodiments, the STE-ICE node 230 has voltages requirements of +9V/−9V/+20V. In one embodiment, the STE-ICE node 230 has a 250 mA current draw on an input of +9V. It is contemplated that in certain embodiments, a STE-ICE node 230 has approximate dimensions of 3.5-inches by 4.5-inches by 1.6-inches and a weight of approximately 19 ounces. The STE-ICE node 230 can also include flash memory and temporary data storage capabilities.

In certain embodiments, the system health node 240 provides a number of functions in the asset management system. For example, the system health node 240 may continuously monitor the controller area network data bus, such as, for example, for data from the data acquisition node 210 or the STE-ICE node 230. The system health node 240 can also include data storage for received data. A system health node 240 may also include a platform for on-board diagnostic and prognostic algorithms specific to the host of the asset management system 200. A system health node 240 can also include interfaces for the data bus and a network, such as, for example, Ethernet, USB, J1939, RS232 and wireless LAN.

It is contemplated that in certain embodiments, the system health node 240 includes an embedded, uninterruptible power supply that allows, for example, processor shutdown protection (e.g., three-minute). It is desirable for the uninterruptible power supply to be capable of operating in a low ambient temperature environment. It certain embodiments, the uninterruptible power supply can include a capacitor-based power supply. In other embodiments, a battery can be used. In certain embodiments, the system health node 240 has input power ranging from 9V to 32V. In one embodiment, the system health node 240 has a 400 mA current draw on an input of +24V and a 3 A maximum draw at start-up to charge the uninterruptible power supply. In one embodiment, a system health node 240 has approximate dimensions of 6.1-inches by 6.1-inches by 3.6-inches and a weight of approximately 75 ounces. The system health node 240 can further include a processor having random memory capabilities. The system health node 240 can also include flash memory and have temporary data storage capabilities.

It is contemplated that in certain embodiments, wireless sensors can be used in an asset management system. For example, wireless sensors may be connected via one of the sensor channels that are connected to the data acquisition node 210. Wireless sensors can be used in ground vehicles for applications, such as, for example, to monitor assets that are outside of the vehicle hull, e.g., planetary and differential gears of drive and/or steering systems. For example, a wireless sensor can monitor the temperature of the differential(s) or the planetar(ies) on a Light Armored Vehicle.

Wireless sensors used for remote data acquisition are contemplated to include sensors based on 802.15.4 standards or similar devices. For wireless temperature sensors, such as, for example, for differential or planetary sensing, the temperature range of the sensor may be from approximately −50° C. to 150° C. Since the sensor is not directly connected with the power supply node 250, a battery is generally used to power the wireless sensor. In one embodiment, a battery life of approximately 1 year using a Li-ion CR2 battery can be obtained based on a data reporting frequency of one minute. The wireless sensor may report, for example, node battery voltage and temperature.

It is contemplated that in certain embodiments the wireless sensor is linked to a wireless coordinator 170 that communicates with the controller area network data bus through the data acquisition node 210 or the STE-ICE node 230. In certain embodiments, the wireless coordinator is J1939 compliant and RS232 capable. In one embodiment, a wireless coordinator for an asset management system 200 is capable of supporting 256 wireless sensors simultaneously or near-simultaneously. A wireless coordinator 270 can have varying ranges over which it can communicate. In one embodiment, the wireless coordinator has a range of approximately 20 meters. It is contemplated that in certain embodiments, the wireless coordinator has dimensions of approximately 2-inches by 4-inches by 1-inch, a weight of approximately 10 ounces and a current draw of 10 mA at 9V. It is further contemplated that in certain embodiments a wireless sensor has dimensions of approximately 3.5-inches by 1.5-inches by 1-inch and a weight of approximately 3 ounces.

It is contemplated that the asset management system 200 also includes a display 280 or other type of user interface to communicate information for the host assets to a user or operator of the host system, such as, for example, the driver of a ground vehicle or the pilot of an aircraft. In the example of a ground vehicle, the display 280 is designed to report vehicle health status and alerts to the operator of the vehicle. An example of a display 280 can include a device that is J1939 compliant and may include an LED or other easily readable visual display. The display 280 can also include status indicators that light up in different colors depending on the condition of an asset (e.g., green, yellow and red indicating, respectively, normal, degraded and nonfunctional). The message format for J1939 compliant communications can include an alert ID, the alert state and display specific data values. It is contemplated that in certain embodiments the display 280 can have dimensions that are approximately 6.9-inches by 3.2-inches by 2.4 inches, weigh approximately 30 ounces and have a current draw of 500 mA at 20V.

An asset management system 200 can also include a series of processor-based instructions for data collection and management. For example, a JAVA-based framework can be used for developing instructions for monitoring the asset management system 200. Components of the data collection and management instructions can include: (i) dynamically configurable functionality, such as, for example, a framework for user-defined data analysis algorithms; (ii) control of data bus and network interfaces based on, for example, J1939 , J1708 and/or J1587 protocols and standards; (iii) a design that allows the usage of, for example, any Java Database Connectivity (JDBC) compliant database that can be implemented with MySQL; and (iv) data caching and database size management functionalities.

The data acquisition node 210 and the STE-ICE node 230 are modules that can be used to acquire asset health data for the host system. One purpose of nodes 210 and 230 is to measure input signals (e.g., voltages) and report associated results on a data bus network. The results may be reported directly (e.g. raw voltages) or processed by the module (e.g. convert voltages into temperatures).

It is contemplated that certain embodiments of the data acquisition systems described herein have a high dynamic range for receiving analog and/or digital signals from sensors in the asset management system. The data acquisition systems can have one or more passive signal conditioning systems to eliminate errors associated with active signal conditioning (e.g., amplifier offsets, nonlinearities, noise). It is further contemplated that in certain embodiments the data acquisition systems include an interface device for monitoring a STE-ICE connector in the system to continually monitor data over a wide range of operating conditions, such as, for example, conditions experienced by the types of hosts described herein. The system can also analyze the monitored data in real-time and provide an assessment of the health of assets associated with the host.

It is contemplated that in certain embodiments, a data acquisition system, such as the data acquisition node 210 or STE-ICE node 230 illustrated in FIG. 2b, can include differential analog input(s) for measuring voltage(s) and/or single-ended digital input(s) for measuring frequenc(ies). For example, sensor channels 212(1)-212(4) can include differential analog inputs and digital channels 213(1)-213(2) can include single-ended digital inputs that are associated with the data acquisition node 210. It is further contemplated that the data acquisition node 210 can include a high dynamic range analog-to-digital converter. The data acquisition node 210 may further include a flash-based, fixed point digital signal processor for processing the voltage and/or frequency data received from the asset-monitoring sensors. In addition, fixed and fully-passive input signal conditioning is contemplated for certain embodiments along with a 250 kbps ISO-11898 compatible controller area network communication interface for placing the monitoring data onto the data bus.

Referring now to FIG. 3, a block diagram illustrating a data acquisition system operation 300 for an asset management system, such as the system illustrated in FIGS. 2a-b, is discussed. Analog inputs 312 can be connected in different manners in the data acquisition chain. For example, an analog input can be connected to analog diagnostic interfaces (e.g., STE-ICE or data acquisition node), to individual sensors, or to other voltage/current sources. The analog inputs 312 may then undergo passive signal conditioning 310, which is used to reduce input signals from the sensors so that the input signals are within the measurement range of the downstream analog-to-digital converter. Furthermore, signal conditioning also provides a level of transient and out-of-range protection and also can reduce the effects of noise on DC or low-frequency signals. By keeping any signal conditioning passive prior to an analog-to-digital conversion, sources of error are eliminated that can occur through active signal conditioning, such as, amplifier offsets, nonlinearities, and noise factor. Furthermore, passive signal conditioning accommodates input scaling, filtering and voltage clamping in a single passive circuit.

After the analog input signals 312 proceed through the signal conditioning 310 process, the signals proceed to the analog-to-digital converter 320. In an embodiment using passive signal conditioning, it can be desirable to use a high dynamic range, high resolution analog-to-digital converter 320. For example, a data acquisition node can use a 24-bit delta-sigma converter, which allows for inputs having a wide dynamic range that maintains good accuracy. For example, for a ±40V input range, a greater than 1 mV precision is still maintained for the 24-bit delta-sigma converter. The greater than 1 mV precision can be maintained without the need for multiple input ranges or programmable gain amplifiers in the data acquisition node (or STE-ICE node). The combination of passive signal conditioning 310 with a high dynamic range, high resolution analog-to-digital converter 320 allows a single or a limited number of data acquisition nodes to receive input signal data from sensors having varying output signals. In certain embodiments, the front-end signal conditioning 310 is entirely passive.

Following the analog-to-digital conversion, the digital data is processed by a digital signal processor 330. It is contemplated that in certain embodiments, the digital signal processor 330 is the main central processing unit for the data acquisition node (or STE-ICE node) and may include a 16-bit processor with an integrated controller area network controller. For example, in certain embodiments, the Freescale™ 56FXXXX family of digital signal controllers can be used in the data acquisition node.

It is contemplated that in certain embodiments, the data acquisition node receives digital inputs 360 that require signal conditioning. Digital signal conditioning 370 can include scaling the digital inputs and clamping the signals. The conditioned digital signals can then be fed into a digital comparator that adds hysteresis to improve the noise immunity of the conditioned digital signal.

It is contemplated that the data acquisition systems receive a power input 390 into a power supply 395 for the data acquisition system. In certain embodiments, a standard set of linear regulators take +9V and −9V bus power and generate a localized +5V, +3.3V, +2.5V (two rails), and −2.5V (two rails) supplies to the circuits of the data acquisition systems. Dual rails are contemplated so that one set of the rails provides power and the second set of rails provides very precise reference generation for the analog-to-digital converter 320. In other embodiments, a switching regulator is contemplated that can create +5V along with an integrated DC-DC inverter integrated circuit to generate −5V.

It is contemplated that certain embodiments of the data acquisition system (e.g., data acquisition node, STE-ICE) can be used to power the external sensors that are used to monitor the host assets. Sensor power 350 can be controlled using a precision programmable voltage output that can provide a source current of up to 100 mA. The sensor power can be controlled through the digital signal processor 330 of the data acquisition system.

Figure 4:
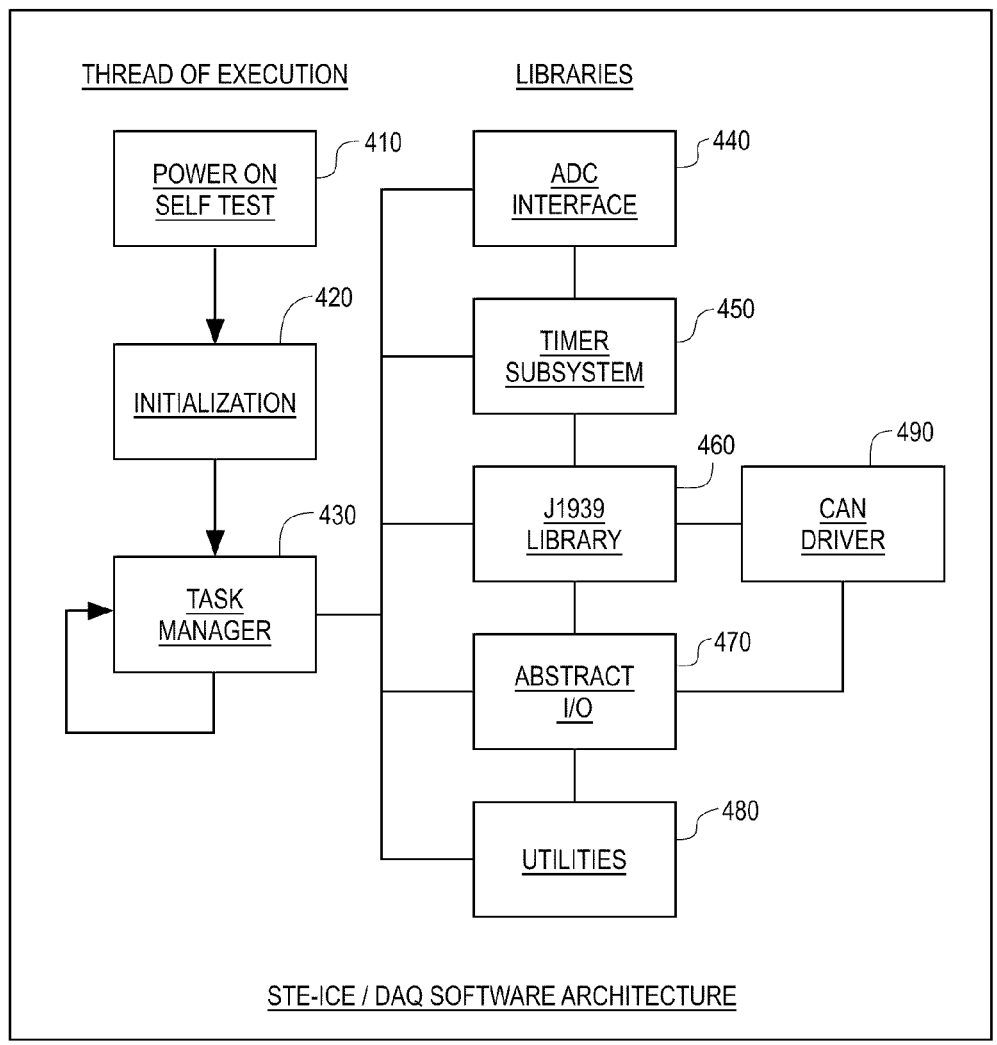
FIG. 4 is a block diagram illustrating operational relationships in a data acquisition system in accordance with one embodiment.

It is contemplated that in certain embodiments that a series of algorithms can be executed in the operation of the STE-ICE node and/or the data acquisition node. The architecture of the various algorithms is illustrated in FIG. 4. Features of certain embodiments of the operational components include (i) basing communication on industry-standard SAE J1939 protocols, (ii) having a custom cooperative multi-tasking architecture, and (iii) having an algorithm structure that allows for individual averaging, scaling, and reporting rates for individual or groups of signals.

It is contemplated that one feature of the algorithms includes a power-on self test 410. The power-on self test 410 can configure the phase-locked loop clock multiplier and wait for the multiplier to stabilize. Furthermore, the power-on self test 410 feature can also include a pre-initialization stage that configures certain elements, such as, for example, the system stack. In certain embodiments in which the data acquisition system uses static random access memory (e.g., STE-ICE), a pseudo-random, non-repeating pattern can be written to external static random access memory and then read back to verify the written pattern.

Another feature of the algorithms that is contemplated includes an initialization step 420. Various components of the data acquisition system can be initialized including input and output from the data acquisition system, the task manager 430, the timer subsystem 450 including starting the main system timer, the controller area network controller 490, the J1939 library 460, and the scheduling of initial tasks.

It is contemplated that certain embodiments can include instructions for an analog-to-digital converter interface 440 that is interrupt-driven. For example, sampling of data in a data acquisition node is initiated by a timer interrupt and the channels, such as the sensor channels, are sampled in a round-robin manner, with each channel sampled at a constant rate. In a STE-ICE node, some signals, such as, for example, battery voltage and current, sampling can occur in multiples of a base sampling rate. For example, some signals can be sampled at twice the sampling rate of other channels. A second interrupt in the analog-digital converter signals when the conversion is complete. The second interrupt can be generated by the analog-to-digital converter itself. The second interrupt takes each completed sample and stores it in its own circular sample buffer. The analog-to-digital converter interface 440 can also perform additional, non-real-time processing of data at the task level. For example, slow-sample first-order filtering or averaging, scaling to engineering units, and formation of bus messages can be completed.

It is contemplated that certain embodiments can include instructions for a timer subsystem 450. For example, a main timer can be used that is a free-running, 32-bit timer operating at a rate of 1 msec. In certain embodiments, the timer can have a rollover interval of approximately 49 days. It is contemplated that interrupts do not need to be used since the current time can be accessed using a threadsafe-function, time_t get_ticks( ).

It is contemplated that certain embodiments can include a J1939 library 460 that provides access to J1939 commands. For example, the J1939 library 460 can include instructions for (i) sending a J1939 packet on the data bus, (ii) receiving a J1939 packet from the data bus, and/or (iii) processing J1939 protocol packets including, for example, network management functions (e.g. claiming addresses, answering requests for address claimed, and assembling long message fragments).

It is further contemplated that certain embodiments can include instructions for a controller area network driver 490 in which the driver 490 can be specific to a target processor. In certain embodiments, a controller area network driver 490 implements an initialization phase, processes an outgoing frame from the j1939 library 460 and sends the controller area network frame using a 29-bit arbitration process. The controller area network driver 490 can also process receive interrupts and deliver the data packets to the J9139 library 460. In certain embodiments, controller area network driver 490 instructions can be used for a number of processors including Freescale DSP56F803 and family, Freescale DSP56F8323 and family and for the Microchip PIC18F248/258/2558 microcontroller family.

It is contemplated that in further embodiments, the asset management system includes a boot loader on one or more of the nodes of the system. For example, a smart boot loader boot loader allows a node to be reprogrammed using messages delivered over the data bus. A boot loader can be stored in a separate, protected part of flash memory. A boot loader may include an abbreviated J1939 library that communicates directly with the controller area network controller. In certain embodiments, the boot loader uses a free-running timer and does not require interrupts.

Figure 5:
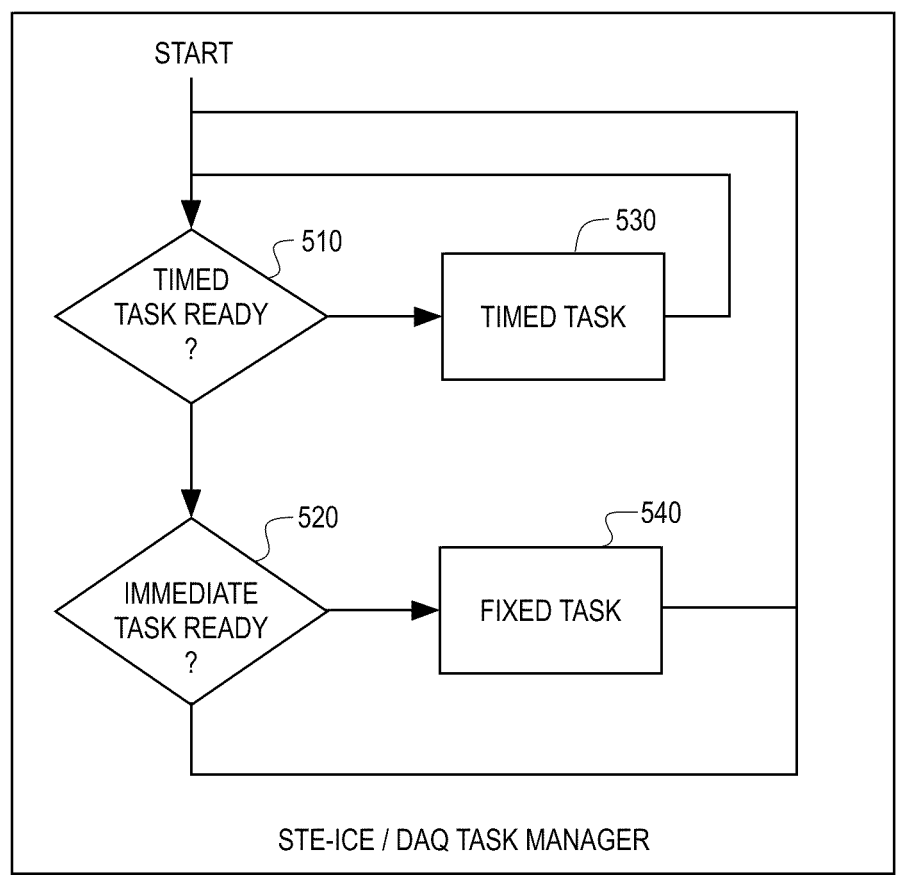
FIG. 5 is a block diagram further illustrating task management operations in the data acquisition system of FIG. 4.

FIG. 5 illustrates the operation of a task manager 430 according to certain embodiments. The task manager 430 controls two task queues including a sleep queue 510 which holds timed tasks 530 and a run queue 520 which hold immediate tasks 540. Timed tasks 530 are those tasks that should be executed after a certain time and immediate or fixed tasks 540 are tasks that should be executed as soon as possible. For example, the task manager 430 can define task control blocks to enumerate various tasks and a function pointer indicates the entry point for an enumerated task. Two state variables, state and substate, can be used by the tasks, including state machines. In certain embodiments, tasks can also store the two state variables statically. The task manager 430 can also include an extra pointer to any additional data that an enumerated task would like to store in memory. It is contemplated that the storage of the additional data occurs at a location other than the task control block(s), which only store the pointer. A time value is used by the sleep queue 510 which indicates the system time after which an enumerated task is executed. The task manager then provides a pointer to the next task control block in the run queue 520 or the sleep queue 510.

The following provide exemplary embodiments of various instructions used to execute certain tasks in the task manager 430. For example, to allow a task access to the tasks state, substate, and extra data, a task function can be written in the form:

```
void taskFunction(TCB* tcb)
{
    ...
}
```

Furthermore, before a timed task 530 or a fixed task 540 is executed, the task is removed from the run queue 520 or the sleep queue 510. For a given task to be executed again, the task can reschedule itself through, for example, an instruction in the following form(s):

```
    void roundRobinTask(TCB *tcb)
    {
        ...
        task_sched(tcb); /* run again as soon as possible */
    }
or
    void roundRobinTask(TCB *tcb)
    {
        ...
        task_sleep(tcb, 500); /* run again after 500 msec */
    }
```

Additional exemplary embodiments of instructions used to execute certain tasks in the task manager 430 include instructions for tasks created by allocating a task control block. The tasks control block can be initiated using a task_init( ) instruction, which accepts as parameters a task's task control block, function pointer, initial state, initial substate and extra data. An example of the instruction is:

```
int main( )
{
    TCB myTask;
    ...
    task_init(&myTask, myTaskFunction, 0, 0, (void *) 0);
}
```

Furthermore, since the multitasker is completely cooperative, complex tasks are encouraged to use software state machine design. For example:

```
void myTaskFunction(TCB *tcb)
{
    switch(tcb->state) {
        case 0:
            first part of task;
            tcb->state++;
            break;
        case 1:
            second part of task;
            tcb->state = 0;
        default:
            tcb->state = 0;
    }
    task_sched(tcb);
}
```

Having thus described certain embodiments of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Further, the recited order of elements, steps or sequences, or the use of numbers, letters, or other designations therefore, is not intended to limit the claimed processes to any order except as may be explicitly specified in the claims. Accordingly, each of the embodiments and obvious variations thereof are contemplated as falling within the spirit and scope of the claimed invention, which is set forth in the following claims.

What is claimed is:

1. An asset management system, the system comprising:
a controller area network bus;
a data acquisition module connected to said controller area network bus, said data acquisition module having a plurality of analog input channels; and
one or more sensor systems connected to said input channels, said input channels receiving analog signals from said sensor systems,
wherein said data acquisition module passively conditions said received analog signals with two or more of input scaling, filtering and voltage clamping without actively conditioning said received analog signals prior to digital conversion.

2. The system of claim 1, further comprising digital input channels for receiving digital signals.

3. The system of claim 2, wherein said digital signals comprise frequency data.

4. The system of claim 1, further comprising a power supply module that provides power to said data acquisition module.

5. The system of claim 4, wherein said power is supplied to said data acquisition module over said controller area network bus.

6. The system of claim 4, wherein power to said one or more sensors is provided by said data acquisition module.

7. The system of claim 1, wherein at least one of said sensor systems is a wireless sensor system.

8. The system of claim 4, wherein said asset management system operates in a ground vehicle.

9. The system of claim 1, wherein said data acquisition module is a Standard Test Equipment-Internal Combustion Engine module.

10. The system of claim 1, wherein said data acquisition module has an input range of approximately −40V to 40V with an accuracy of approximately ±100 mV.

11. An asset health management system, the system comprising:
a data acquisition module connected to a data bus, said data acquisition module having a plurality of input channels;
a power supply module that provides power to said data acquisition module; and
a plurality of sensors connected to said input channels, at least one of said sensors having a different power requirement than another sensor,
wherein power to each of said plurality of sensors is provided based on said power requirement of each sensor, said power provided through said data acquisition module and wherein a current of up to 100 mA is supplied to said sensors through power provided to said data acquisition module.

12. The system of claim 11, wherein said supply of power to said sensors is digitally programmable.

13. The system of claim 12, wherein a current of up to 100 mA is supplied to said sensors through power provided to said data acquisition module.

14. The system of claim 11, wherein said input channels are capable of receiving analog signals from said sensors.

15. The system of claim 14, wherein said data acquisition module passively conditions said received analog signals prior to converting said signals into digital data.

16. A data acquisition device for an asset management system, the device comprising:
a plurality of analog inputs for receiving first signal data from a first sensor and second signal data from a second sensor, said analog inputs capable of receiving first signal data having a different voltage range than said second signal data;
a passive analog signal conditioner for passively conditioning said first signal data and said second signal data with two or more of input scaling, filtering and voltage clamping without any active conditioning; and
a high dynamic range analog-to-digital converter for converting said passively and not actively conditioned first signal data and said passively and not actively conditioned second signal data, said analog-to-digital converter connected to said passive analog signal conditioner,
wherein said analog-to-digital converter operates over a single input range.

17. The device of claim 16, wherein said signal data received by said analog-to-digital converter is non-amplified analog signal data.

18. The device of claim 16, wherein at least one of said first sensor and said second sensor is wireless.

19. The device of claim 16, wherein said analog-to-digital converter supports an input range of at least ±40V with a precision greater than 1 mV.

20. The device of claim 16, wherein said sensors are powered using power from said data acquisition device.

21. An asset management system, the system comprising:
a controller area network bus;
a data acquisition module connected to said controller area network bus, said data acquisition module having a plurality of analog input channels; and
one or more sensor systems connected to said input channels, said input channels receiving analog signals from said sensor systems,
wherein said data acquisition module passively conditions said received analog signals with two or more of input scaling, filtering and voltage clamping prior to digital conversion and said data acquisition module has an input range of approximately −40V to 40V with an accuracy of approximately ±100 mV.

22. A data acquisition device for an asset management system, the device comprising:
a plurality of analog inputs for receiving first signal data from a first sensor and second signal data from a second sensor, said analog inputs capable of receiving first signal data having a different voltage range than said second signal data;
a passive analog signal conditioner for conditioning said first signal data and said second signal data with two or more of input scaling, filtering and voltage clamping; and
a high dynamic range analog-to-digital converter for converting said first signal data and said second signal data, said analog-to-digital converter connected to said passive analog signal conditioner,
wherein said analog-to-digital converter operates over a single input range and supports an input range of at least ±40V with a precision greater than 1 mV.

* * * * *